(No Model.)
A. L. CUDEY.
ELASTIC WHEEL TIRE.
No. 603,726. Patented May 10, 1898.
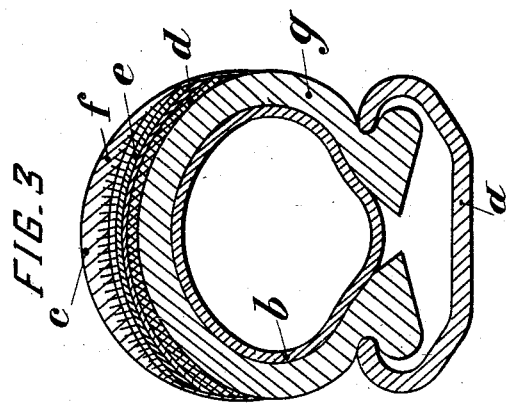
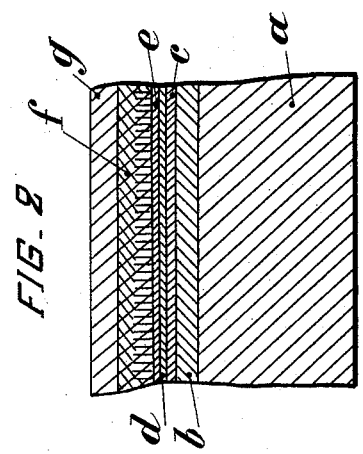
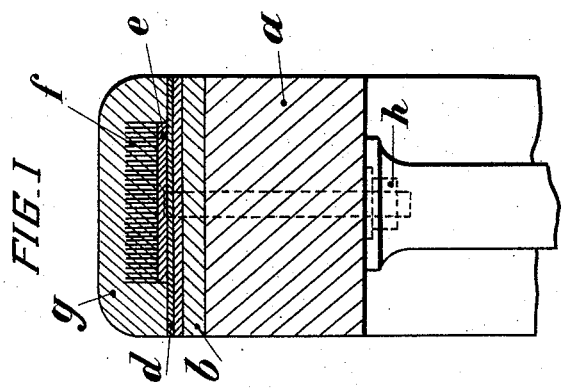
Witnesses
Inventor
Albert Lambort Cudey
By Briesen & Knauth
his Attorneys

UNITED STATES PATENT OFFICE.

ALBERT LAMBERT CUDEY, OF BROSVILLE, FRANCE.

ELASTIC WHEEL-TIRE.

SPECIFICATION forming part of Letters Patent No. 603,726, dated May 10, 1898.

Application filed December 23, 1897. Serial No. 663,122. (No model.) Patented in France October 15, 1896, No. 260,464.

*To all whom it may concern:*

Be it known that I, ALBERT LAMBERT CUDEY, of Brosville par Evreux, (Eure,) France, have invented an Improvement in the Manufacture of Elastic Wheel-Tires, Boot-Soles, and other Articles, (for which I have obtained Letters Patent in France for fifteen years, dated October 15, 1896, No. 260,464,) of which the following is a full, clear, and exact description.

My invention relates to a new product adapted for many uses, and more especially for making wheel-tires, boot-soles, &c., and consisting of a card-fillet embedded in elastic material, as hereinafter described.

The invention is illustrated in the accompanying drawings, in which—

Figure 1 represents a cross-section, and Fig. 2 a longitudinal section, of my improved elastic band applied as a tire to a wheel having a wood rim. Fig. 3 is a cross-section showing the band applied as a cover for a pneumatic tire.

Referring to Fig. 1 of the drawings, $a$ is the wood, encircled by a metal hoop $b$, upon which is superposed a band of india-rubber $c$ and upon this another metal hoop $d$. Around the hoop $d$ is applied an endless band $e$, of leather or other suitable material, set with card-teeth $f$, embedded in the india-rubber $g$, forming the tread of the tire. The elastic tire thus formed is fixed to the rim $a$ by means of bolts $h$ or other suitable means.

It will be seen that the elasticity of the wheel is obtained by the interposition of the card-surface embedded in the india-rubber and by the metal hoops, so that wear will be considerably reduced, while the elasticity of the tire will be preserved.

In Fig. 3 the cover $g$, which incloses the air-chamber $b$, has cemented or otherwise applied to it a band of rubber $c$, thinned off at its edges and lined on its interior with a band of rubber cloth $d$. In the rubber band $c$ is embedded an endless band $e$, preferably of ramie cloth, set with card-teeth $f$, the whole forming a protective tread, the cover of the elastic tire thus constructed being attached to the wheel-rim $a$ in any suitable manner. The endless card-fillet may also be embedded in the cover $g$ itself, provided that a sufficient thickness of india-rubber be interposed between the card-fillet and the air-chamber $b$ to prevent the latter being punctured by the card-teeth, the advantage of this construction being that the cover has no additional bands cemented onto it and is therefore more durable. As in the former case, the presence of the card-fillet embedded in the india-rubber cover of a tire, wear will be considerably reduced without prejudice to the elasticity of the tire.

The card-teeth may be either bent, straight, or curved, or be made of various forms, and when embedded in any suitable elastic material may be backed by any suitable fabric or material.

The elastic tires above described are suitable for the wheels of all kinds of road vehicles and velocipedes, and the same material may be used for making boot-soles, &c.

I claim—

1. As a new article of manufacture, a card-fillet having the card-teeth embedded in elastic material to form a material suitable for the tread of an elastic wheel-tire, or for making boot-soles &c., substantially as specified.

2. An elastic tire for wheels formed of a card-fillet in combination with a covering mass of india-rubber in which the card fillet and teeth are embedded substantially as specified.

3. An elastic tire for wheels formed of a card-fillet in combination with a covering mass of india-rubber in which the card fillet and teeth are embedded, and with backing-strips of metal and india-rubber substantially as specified.

The foregoing specification of my improvement in the manufacture of elastic wheel-tires, boot-soles, and other articles signed by me this 3d day of December, 1897.

ALBERT LAMBERT CUDEY.

Witnesses:
EDWARD P. MACLEAN,
MAURICE HENRI PIGUET.